Aug. 28, 1962 D. L. BORGIA 3,051,496

APPLIED RECORD SPACING DISC

Filed July 17, 1958

INVENTOR.
DOMENICO LAWRENCE BORGIA
BY
Barthel & Bugbee
ATTY'S.

United States Patent Office 3,051,496
Patented Aug. 28, 1962

3,051,496

APPLIED RECORD SPACING DISC

Domenico Lawrence Borgia, 9910 Blackburn Ave., Livonia, Mich.

Filed July 17, 1958, Ser. No. 749,170
2 Claims. (Cl. 274—42)

This invention relates to phonograph records and in particular, to means for enabling the safe stacking of phonograph records, either for storage or for continuous operation on a phonograph.

One object of this invention is to provide a protective stacking device for phonograph records consisting of a centrally-apertured transparent disc attached to the phonograph record in a concentric position therewith and superimposed upon the central label so as to enable the inscription on the label to be easily read yet to space the sound-grooved portions of the record apart from one another when they are stacked upon one another, thereby preventing rubbing and consequent damage to the sound groove peripheral portions of the records.

Another object is to provide a protective stacking device for phonograph records, of the foregoing character wherein the spacing disc or discs is secured to the central portion of the phonograph record over the label thereof by a layer of transparent adhesive which effects attachment thereof while permitting clear visibility of the label inscription through the adhesive layer.

Other objects and advantages of the invention will become apparent during the course of the following description of the accompanying drawing, wherein.

Figure 7:
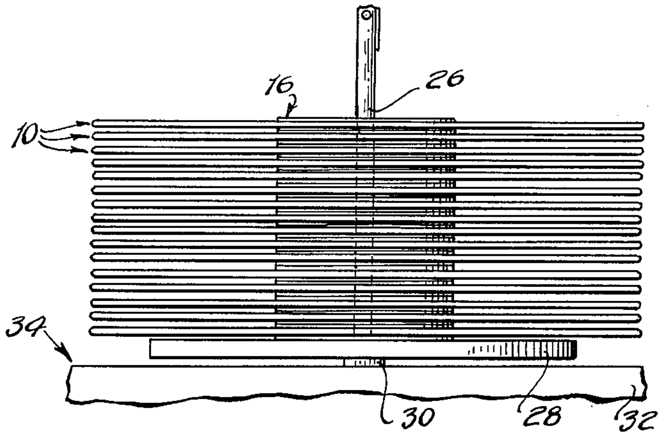
FIGURE 7 is a side elevation of a phonograph turntable carrying a stack of protected spaced phonograph records according to the invention.
Figures 1, 3, 4, 5:
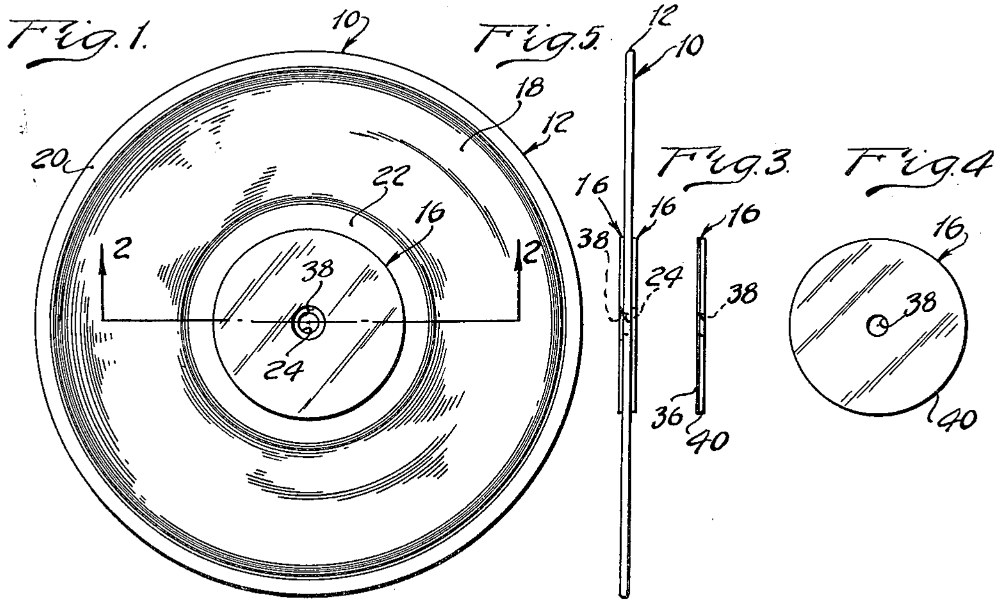
FIGURE 1 is a front elevation of a protected stackable phonograph record, disposed in a vertical plane, according to one form of the invention.
FIGURE 3 is a side elevation of one of the transparent spacing discs applied to the phonograph record of FIGURES 1 and 2.
FIGURE 4 is a front elevation of the spacing disc shown in FIGURE 3.
FIGURE 5 is a side elevation of the protected stackable phonograph of FIGURE 1.
Figure 2:
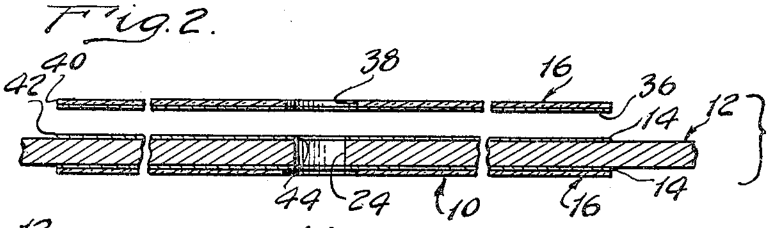
FIGURE 2 is an enlarged fragmentary cross-section through the protected stackable phonograph record of FIGURE 1, taken along the line 2—2 therein, with one of the transparent spacing discs about to be applied to the record.
Figure 6:
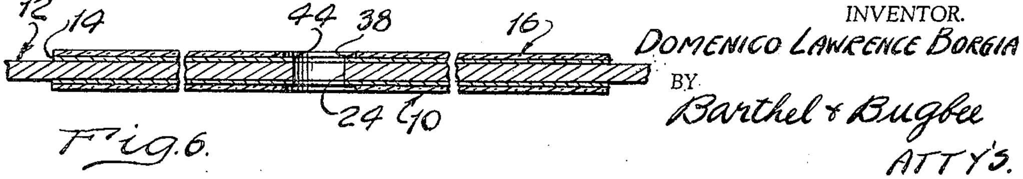
FIGURE 6 is an enlarged fragmentary cross-section similar to FIGURE 2 but showing both spacing discs fully applied to both sides of the phonograph record.

Referring to the drawing in detail, FIGURES 1 to 4 inclusive show a protected stackable phonograph record, generally designated 10, according to one form of the invention as consisting generally of a conventional phonograph record 12 with a central circular label 14 carrying the description of the record and upon which centrally-apertured protective stacking or spacing discs 16 have been superimposed. The phonograph record 12 has the usual sound-grooved intermediate portion 18, ungrooved outer annular rim portion 20, and ungrooved central circular portion 22, the label 14 being smaller in diameter than the central portion 22. The latter has the usual central hole 24 for receiving the central pin 26 of the phonograph turntable 28 (FIGURE 7) the turntable 28 being in turn mounted upon the usual vertical shaft 30 connected to a conventional motor (not shown) within the housing or cabinet 32 of the phonograph 34. The phonograph or record player 34 is conventional and its details are beyond the scope of the present invention, it being shown diagrammatically as one of many types of phonographs or record players.

The spacing disc 16 is preferably of a transparent material, such as transparent synthetic sheet plastic material which is easily secured by a suitable adhesive layer 36 (FIGURE 2) to the label 14, and is preferably of the same diameter as the label 14 and has a central hole 38 which is slightly larger in diameter to the central record hole 24 and concentric therewith in the attached position. In other words, the edge 40 of the spacing disc 16 is of the same diameter as the edge 42 of the label 14 when the holes 24 and 38 of the record 12 and spacing disc 16 respectively and the similar central hole 44 of the label 14 are aligned concentrically with one another. The larger central hole 38 is provided for the purpose of allowing free lateral movement of the actuating mechanism in the central pin 26 which drops the record to the playing position. From FIGURES 2 and 7 and from the foregoing objects and description it will be evident that the spacing disc is of materially greater thickness than the thickness of the label in order that the records 10 shall not rub against one another, even when the records 10 become warped, as frequently occurs during storage.

In converting an ordinary phonograph record 12 into the protected stackable phonograph record 10, the operator selects a protective spacing disc 16 of corresponding diameter to the label 14 with an adhesive coating 36 preferably already applied to one side thereof. He then aligns the hole 38 with the hole 24 in the record 12 and presses the disc 16 down upon the label 14, while maintaining the spacing disc 16 concentric with the label 14 and the holes 24, 38 and 44 in alignment with one another. In the preferred form of the invention, the adhesive layer 36 is a pressure-sensitive adhesive covered with a tearoff disc (not shown) of paraffin paper or similar material. Many types of pressure-sensitive adhesive are obtainable on the open market. This pre-coated stacking disc 16 eliminates the necessity for the operator to apply adhesive and results in a simpler and cleaner operation. The same procedure is followed with the disc on the opposite side of the record 12, as shown in the lower part of FIGURE 2.

In the operation of the invention, the protected stackable records 10 are stacked in the usual manner (FIGURE 7) on the record player in position to be dropped into playing position, the stack shown in FIGURE 7 being of a series of records all of which have been played. The various records cannot contact one another in their sound-grooved zones 18 because the spacing discs 16 prevent such contact. At the same time, however, the inscription on the label 14 can be read through the spacing disc 16 because of its transparency.

What I claim is:

1. A stackable phonograph record protected against rubbing, comprising a circular record disc having a centrally-disposed circular label area with a central hole therein, an annular rim portion disposed concentric with said label area and hole, and an annular sound groove zone disposed between said rim portion and said label area in concentric relationship therewith; a centrally apertured circular label secured to said central label area in concentric relationship therewith, a centrally-apertured rub-preventing spacing disc of transparent material of substantially the same diameter as said label superimposed upon said label in concentric relationship therewith, said spacing disc being of materially greater thickness than the thickness of said label and having an outer face elevated a substantial distance above said rim portion and sound groove zone, said spacing disc having a central hole therein aligned with said record disc hole and having an inner face, and a layer of transparent adhesive material interposed between the outer face of said label and said inner face of said spacing disc.

2. A safety stacking device adapted to be applied to a phonograph record having a centrally-disposed circular label area and an annular rim portion with a sound groove zone disposed therebetween, said stacking device comprising a circular disc of transparent sheet material of approximately the same diameter as the label and of materially greater thickness than the thickness of said label, said disc having a central hole therein and a layer of transparent adhesive material disposed on one side thereof.

References Cited in the file of this patent

UNITED STATES PATENTS

| | | |
|---|---|---|
| 2,501,465 | Caramanoff | Mar. 21, 1950 |
| 2,536,922 | Durbrow | Jan. 2, 1951 |
| 2,596,179 | Seymour | May 13, 1952 |
| 2,600,573 | Rabkin | June 17, 1952 |
| 2,846,230 | Richter | Aug. 5, 1958 |
| 2,886,327 | Goldenberg | May 12, 1959 |

FOREIGN PATENTS

| | | |
|---|---|---|
| 381,164 | Great Britain | Sept. 26, 1932 |
| 646,138 | Great Britain | Nov. 15, 1950 |
| 811,877 | Great Britain | Aug. 23, 1951 |
| 707,841 | Great Britain | Apr. 21, 1954 |